Patented May 29, 1951

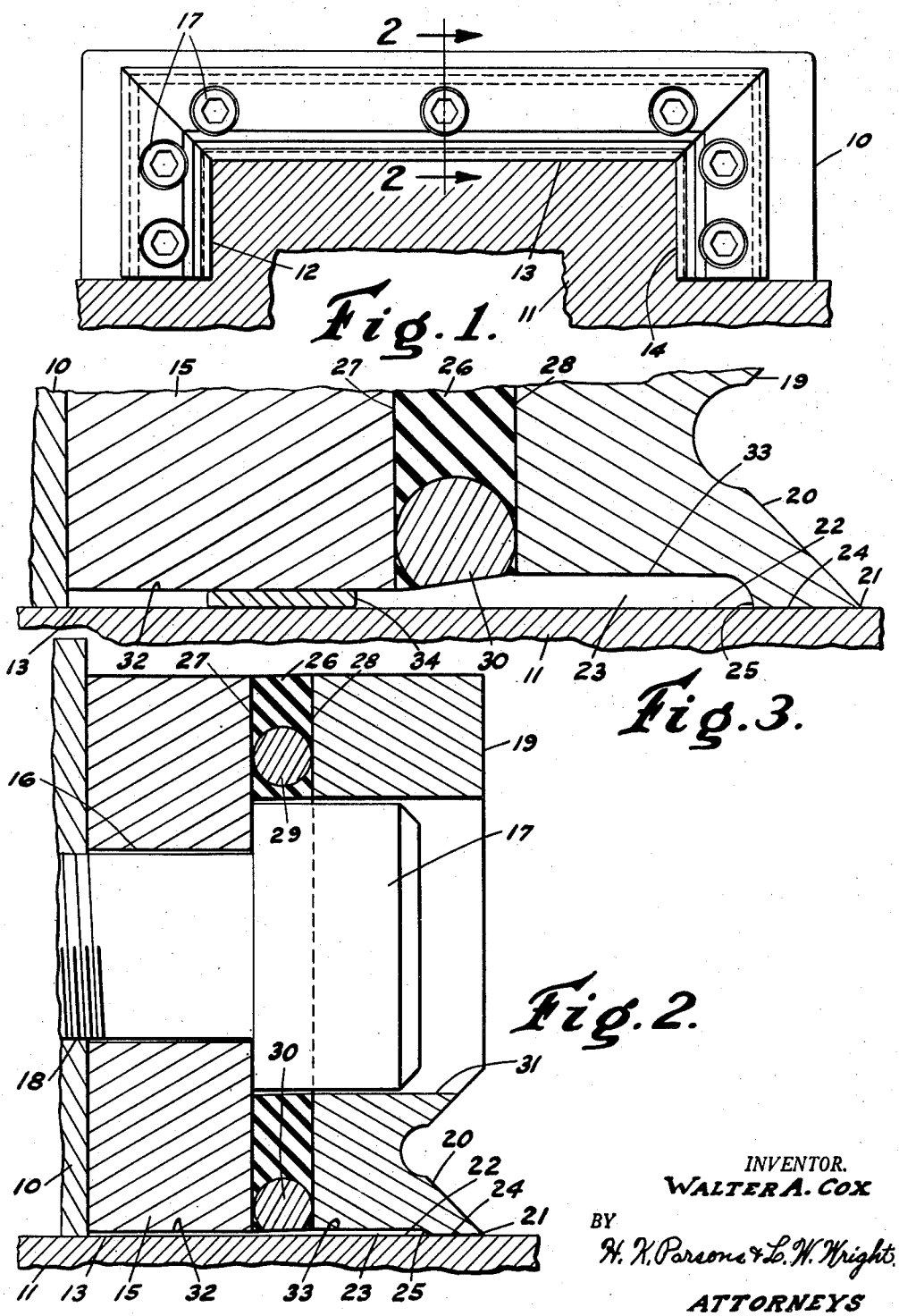

2,555,223

UNITED STATES PATENT OFFICE 2,555,223

WIPER MECHANISM FOR MACHINE
GUIDEWAYS

Walter A. Cox, Cincinnati, Ohio, assignor to The
Cincinnati Milling Machine Co., Cincinnati,
Ohio, a corporation of Ohio Application February 5, 1948, Serial No. 6,470

4 Claims. (Cl. 308—3.5)

This invention relates to the protection of machine guideways and more particularly to a wiper mechanism therefor.

One of the objects of this invention is to provide an improved wiper for a machine guideway such as the guideway of a machine tool.

Another object of this invention is to simplify the construction of wiper mechanisms by eliminating loose parts and thus provide a unit that may be easily and quickly attached to a machine part.

Another object of this invention is to provide a wiper mechanism which has improved cleaning qualities and is more efficient in operation than prior devices.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevational view of a mechanism embodying the principles of this invention.

Figure 2 is an enlarged section on the line 2—2 of Figure 1.

Figure 3 is an enlarged detail section of a portion of Figure 2.

For the purposes of illustration and explanation, the wiper mechanism of this invention is shown in Figure 1 as applied to a movable slide 10 of a machine having a support member 11 upon which is formed guide surfaces 12, 13, and 14 for supporting and guiding the movement of the member 10. The wiper mechanism is attached to the member 10 in a manner to cooperate with the guide surfaces 12, 13, and 14, for the purpose of cleaning them and preventing dirt or other foreign material from working its way between the guide surfaces. The wiper mechanism of this invention is so designed that it may be manufactured as a self-contained unit which may be readily attached or secured to the moving member as by a plurality of screws or bolts.

The specific construction of a wiper unit is shown in Figure 2 and comprises a base member 15 which is preferably rectangular in cross section and of a length suitable for the width of the guideway to which it is to be applied. The member 15 is provided with suitable holes 16 through which clamping members, such as the clamping bolt 17, may be passed, and threaded at 18 into the moving member 10, from which it will be noted that the member 15 is thus solidly secured between the head of the bolt 17 and the face of the member 10.

The member 19 is actually the wiping member and is substantially rectangular in cross section and of suitable length, but a portion of it is cut away to form a V-shaped groove 20 of such angle as to form a wiping edge 21 which is adapted to ride on the guideway. The bottom face 22 of member 19 is partially cut away to form a clearance space 23 and the shoe portion 24 which slides on the guide surface.

By cutting away the clearance 23 there is also formed a shoulder 25 which also serves as a scraping edge when the slide is moving toward the left as viewed in Figure 2, while the edge 21 serves the same purpose when the part is moving toward the right as viewed in this figure.

The scraping member 19 is attached to the base member 15 by molding an intervening layer 26 of a suitable form of synthetic rubber which will adhere to the opposed faces 27 and 28 of members 15 and 19 respectively. The thickness of this layer of resilient material is determined by a pair of separating members 29 and 30 which may be in the form of steel pins which are non-compressible and which are so located as to be embodied or molded in the resilient material and thereby automatically held in position. These pins are of the same diameter so that the members are held parallel and also substantially perpendicular to the guide surfaces. These pins also perform the function of rollers in that upon relative movement between the scraper member 19 and the supporting member 15, in which event the resilient material is placed under stress, the pins will have a tendency to roll rather than slide, even although they are molded in the material.

It will be noted from Figure 2 that the member 19 has a clearance hole 31 for the head of the bolt 17 so that the member 19 is capable of vertical movement without interference with the bolt head and also that the member 19 is connected to the member 15 solely by the intervening layer of resilient material.

It is, of course, necessary that the shoe 24 be continuously pressed against the guide surface and in order to accomplish this the resilient material must be placed under a certain amount of stress. This is accomplished by the manner in which the unit is attached to the sliding member. This is accomplished as follows: the screws 17 are inserted and threaded into the member 10 with the shoe resting on the guide surface to be wiped. The number of these screws will obviously vary in accordance with the width of the surface to be wiped and the length of the wiping member. All of the screws are tightened to develop a small amount of holding friction between the opposed faces, in which case the parts would be in the position shown in Figure 2. In order to determine the amount of pressure of the shoe on the guideway, the construction is such that the bottom surface 32 of the member 15 is in alignment with the bottom clearance surface 33 of the member 19. It is now possible to place a spacer, which is indicated by the reference numeral 34 in Figure 3, between the surface 32 and the guide surface which may be assumed to be the surface 13. The spacer member 34 is of a width less than the width of the clearance space 23 by a predetermined amount dependent upon the amount of pressure it is desired to develop on the shoe 24. The member 15 may now be tapped down against the holding friction until it engages the top surface of the spacer and in so doing the rubber or other resilient material is placed under a shearing stress which is in the nature of a preload which continuously urges and holds the shoe into engagement with the surface to be wiped.

The screws then are further tightened to hold the parts in this condition and the spacer is removed.

The wiping member is now held preloaded in contact with the surface to be wiped and is capable of vertical movement either up or down in response to any slight irregularity in the surface of the guideway encountered during movement of the member 10 along the guide. The resilient material functions to hold the wiper member toward the supporting member 15, but the pins hold the parts in definite spaced relation and also insure that the wiper member moves parallel to the base member.

It is assumed that the guide surfaces will be suitably lubricated, and in machine tools this is commonly done by some form of force lubrication to maintain a film of lubricant between the opposed bearing surfaces. Therefore, upon movement of member 10 relative to the fixed member the oil between the surfaces will collect in the clearance space against the surface 25 and will tend to seep under the shoe 24, and thereby lubricate the same, and such oil collecting against the surface 25 will tend to run out the ends of the wiper blade and thereby tend to wash away any dirt or chips that collect against the surface 25. As the shoe moves to the left in this direction it tends to spread a film of lubricant upon the guide surface so that upon movement in the opposite direction or to the right, as viewed in Figure 2, the edge 21 will be working against a lubricated surface which, in turn, will attempt to pile up lubricant against the edge 21 and also act to wash chips away from this edge.

There has thus been provided an improved scraper mechanism which is particularly adaptable for machine tools and the like having guideways that are subject to falling chips and dirt and which can be made as a complete unit without any loose parts and may be quickly and easily attached to the moving part.

What is claimed is:

1. In a wiping mechanism for a movable slide of a machine, the combination of a base member adapted to be rigidly connected to said movable slide, a wiping member shaped to form a wiping edge in contact with the surface to be wiped, said members having opposed parallel faces, resilient material molded intervening said faces and adhering thereto to form a sole connection between said members while permitting relative movement therebetween, and rigid spacing means between said faces and molded in said material for confining relative movement between said members in a direction parallel to their opposed faces.

2. In a wiper mechanism for the supporting guiding surface of a movable machine slide, the combination of a base member, a wiping member having a wiping edge for frictional engagement with said guiding surface, an intervening molded resilient means adhering to opposing surfaces of said members for interconnecting them, and means for rigidly connecting said base member to an end face of the movable slide with said opposed surfaces substantially normal to said guiding surface to place said resilient means under shear to maintain said wiping edge in contact with said guiding surface.

3. In a wiper mechanism for the guiding surface of a movable machine slide, the combination of a support member and a wiping member having opposed surfaces, means connecting said members together for limited transverse movement of one with respect to the other including resilient means molded between and adhering to said opposed surfaces, said wiping member having a wiping blade extending substantially parallel to said opposed surfaces, means to secure the supporting member to the movable slide with the wiping blade in contact with said guide surface under sufficient pressure to create and maintain shear in said resilient means.

4. In a wiper mechanism for the guiding surface of a movable machine slide, the combination of a base member, a wiping member having a wiping edge adapted to the arranged transversely of said guiding surface, means connecting the wiping member to the base member including a resilient means molded between said members and adhering to opposing faces thereof, and means for rigidly connecting said base member to the end of the movable slide with said opposing faces substantially normal to said guiding surface and with said wiping edge in contact with said guiding surface under sufficient pressure to maintain said resilient means under shear to maintain the wiping edge in pressural contact with said guiding surface.

WALTER A. COX.

REFERENCES CITED

The following references are of record in the file of this patent:

UNITED STATES PATENTS

| Number | Name | Date |
|---|---|---|
| 509,864 | Booth | Dec. 5, 1893 |
| 680,345 | Morrison | Aug. 13, 1901 |
| 1,676,311 | Zimmerman | July 10, 1928 |
| 1,938,786 | Vancil | Dec. 12, 1933 |
| 1,991,177 | Rutz et al. | Feb. 12, 1935 |